United States Patent [19]

Bradshaw

[11] 4,190,229
[45] Feb. 26, 1980

[54] HOT DOG BUN PAN

[76] Inventor: David R. Bradshaw, P.O. Box 1364, Selma, Ala. 36701

[21] Appl. No.: 872,623

[22] Filed: Jan. 26, 1978

[51] Int. Cl.² .......................................... A21C 11/00
[52] U.S. Cl. .................................. 249/124; 249/142; 249/DIG. 1
[58] Field of Search .............. 249/122, 124, 144, 149, 249/DIG. 1, 125, 142, 133; 425/468

[56] References Cited

U.S. PATENT DOCUMENTS

| | | | |
|---|---|---|---|
| 1,679,660 | 8/1928 | Haskell | 426/391 |
| 1,696,343 | 12/1968 | Burdick | 249/124 |
| 1,975,031 | 9/1934 | Wilkes | 426/27 |
| 2,003,578 | 6/1935 | Clement | 426/499 |
| 2,018,950 | 10/1935 | Couture | 99/427 |
| 2,255,089 | 9/1941 | Simonds | 249/133 X |
| 2,890,958 | 6/1959 | Birnkrant | 426/283 |
| 3,341,167 | 9/1967 | Weiss | 249/66 |
| 3,379,120 | 4/1968 | Fogle | 425/468 X |
| 3,385,205 | 5/1968 | McCloud | 249/149 X |

Primary Examiner—William R. Briggs
Attorney, Agent, or Firm—Victor J. Evans & Co.

[57] ABSTRACT

Disclosed herein is an apparatus for forming a plurality of hot dog buns provided with a recessed area formed at the inception of the bun making process, so as to naturally accommodate a hot dog. One technique according to the present invention contemplates cooking the hot dog buns separately from the hot dog and inserting the hot dog at a later time when it is to be consumed, or alternatively inserting the hot dog into the partially cooked bun after the recess has been formed in the bun so that the hot dog and the bun cook simultaneously.

3 Claims, 8 Drawing Figures

U.S. Patent   Feb. 26, 1980   Sheet 1 of 2   4,190,229
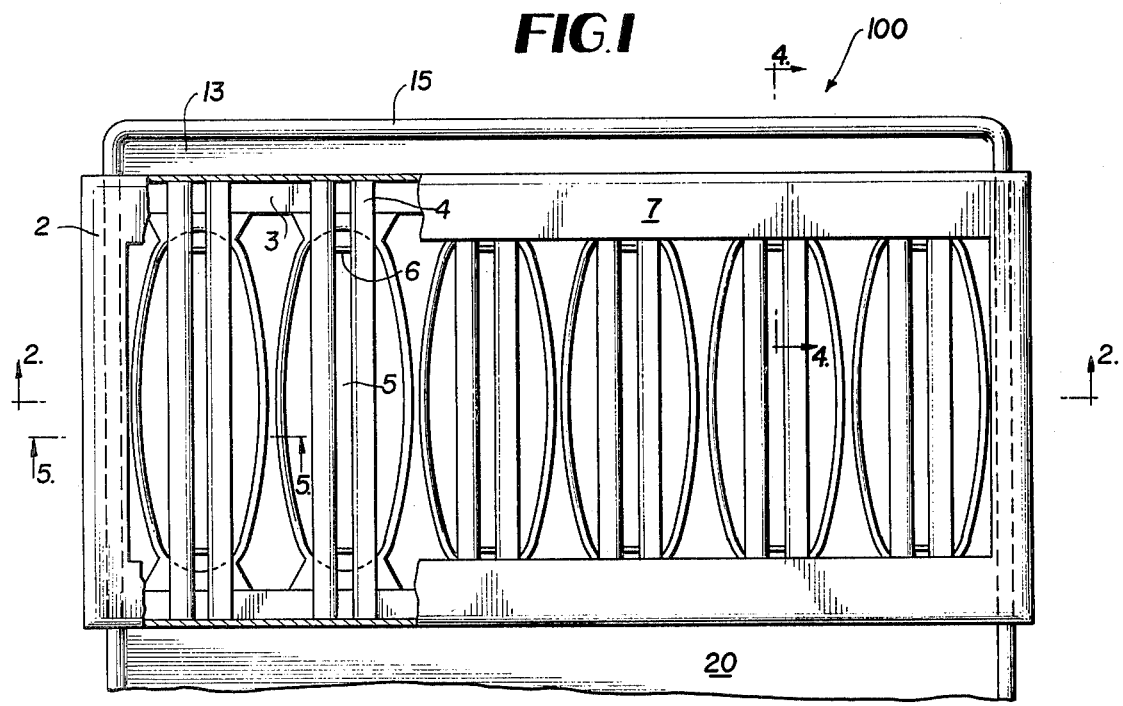
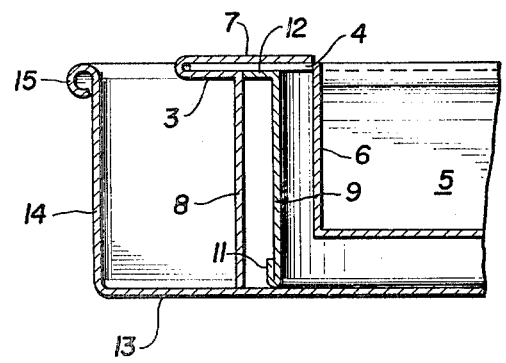
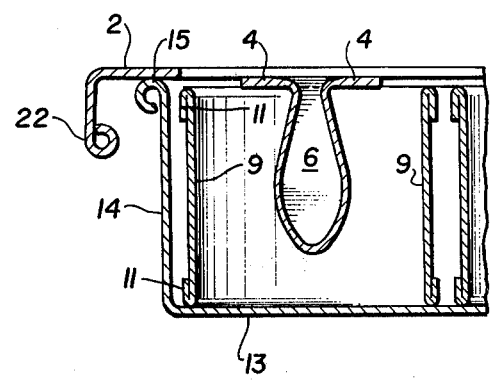
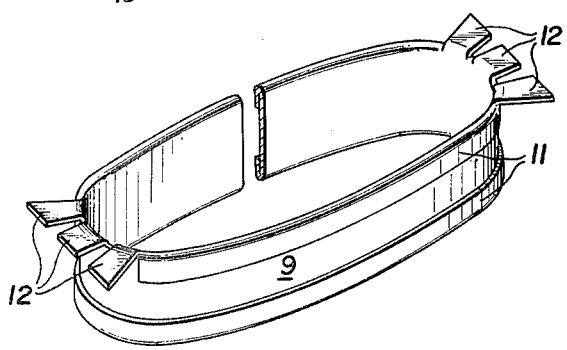
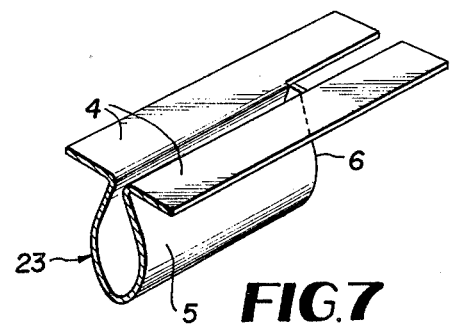

HOT DOG BUN PAN

BACKGROUND OF THE INVENTION

The conventional practice for providing a hot dog roll with its associated hot dog is to take the roll and slit it along a longitudinal plane thereof so that the hot dog may be sandwiched therebetween.

U.S. Pat. Nos. of which the inventor is aware of include 1,679,660, 1,775,031, 2,003,578, 2,018,950 and 2,890,958.

None of these references anticipate the following specification and claims in that they are all relegated to well known and established techniques for consumption of this type.

SUMMARY OF THE INVENTION

Accordingly, the present invention eliminates the handling aspects of a plurality of hot dog buns separately from hot dogs and slicing operations and provides a technique and an apparatus for serving a plurality of hot dogs and their buns in an expeditious and therefore economical manner. The expediency naturally follows because of the nature of the apparatus which causes a recess to be formed within the hot dog bun when the bun is industrially manufactured and additionally contemplates cooking the hot dog simultaneously with the bun.

OBJECTS OF THE INVENTION

Accordingly it is an object of this invention to provide an apparatus for cooking a plurality of hot dog rolls with a recess integrally formed therewith to accommodate a hot dog.

Another object of this invention contemplates partially cooking the roll thus formed so as to there receive a hot dog for subsequent simultaneous cooking.

A third object contemplates the above identified cooking apparatus and technique in an economical, efficient, and expeditious manner.

These and other objects will be made manifest when considering the following detailed drawings and specification.

BRIEF DESCRIPTION OF THE DRAWINGS

FIG. 1 is a top plan view of the apparatus according to the invention with panel sections partially removed to indicate the relative cooperation of the components;

FIG. 4 is a sectional view taken along lines 4—4 of FIG. 1;

FIG. 5 is a sectional view taken along lines 5—5 of FIG. 1;

FIG. 6 is a perspective view of the bun forming mold;

FIG. 7 is a perspective view of a portion of the hot dog recess forming mold.

DESCRIPTION OF THE PREFERRED EMBODIMENT

Figure 2:
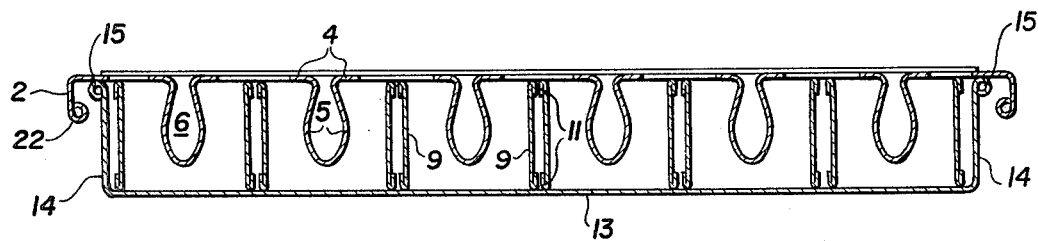
FIG. 2 is a sectional view taken along lines 2—2 of FIG. 1.
Figure 3:
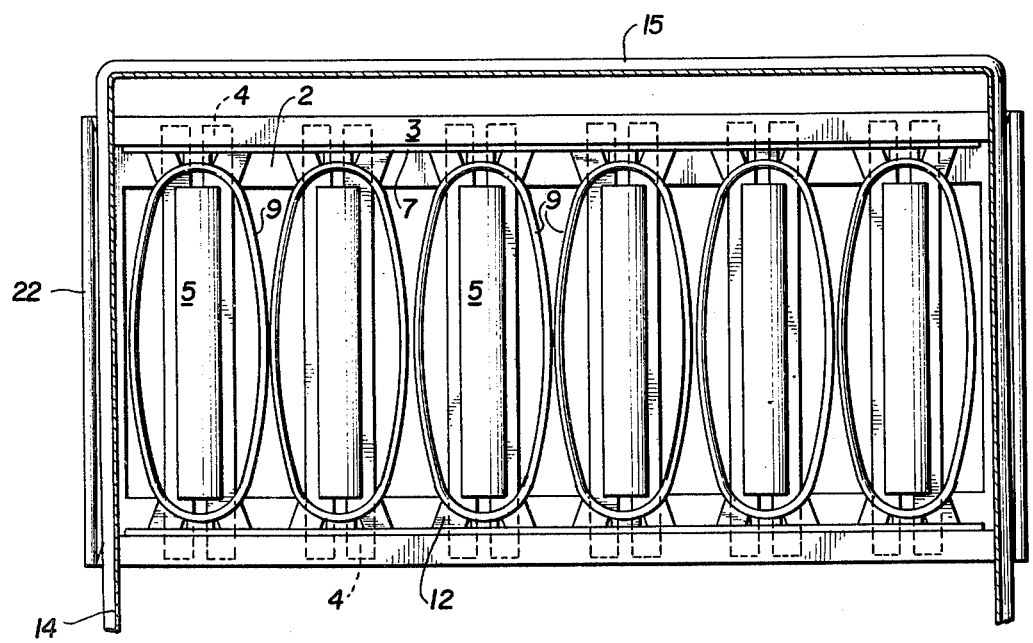
FIG. 3 is a bottom plan view of the apparatus of FIG. 1 with a portion of a cover removed.

Referring to the drawings now wherein like reference numerals refer to like parts throughout the several drawings reference numeral 100 refers to the apparatus according to the present invention.

The apparatus 100 may generally be regarded as being comprised of at least one rectanguloid tray 20 having upstanding side walls 14 and a curved flange portion 15 along the top edge of the side walls to accommodate a holding rack 2.

In addition to the rectangular bottom panel 13, the vertically upstanding walls contiguous therewith 14, and the lip flange portion 15 surrounding the periphery thereof, the rectangular holding rack 2 is provided on two sides thereof with a U-shaped ledge having a lower portion 3 and an upper portion 7 whose purpose will be explained hereinafter. It is to be noted however that the upper portion 7 has not only a greater horizontal extent then the lower portion 3, but that both portions extend over the vertical wall 8 on two faces of this holding rack and therefore a flanged lip 22 does not extend around the entire periphery of the holding rack but is relegated to two parallel faces which overlie the tray 20.

Disposed within this tray are a plurality of hot dog bun molds 9 having a generally oval configuration and a flanged upper and lower periphery 11. At the longitudinal extremities of this oval mold 9 the flanges are interrupted to provide a plurality of outstanding tabs 12 which extend outward in a horizontal direction. As can be seen in FIG. 4, these tabs nest coplanar with horizontal portion 3 of the rack 2 and are thereby constrained from motion by the relatively tight fit. Nested within these molds 9 are the recess forming devices 23 for providing the contour of a hot dog within the mold cavity. The recess forming device can generally be regarded as having a U-shaped cross-section in which the vertical legs 5 taper inwardly towards each other and are provided with outwardly extending horizontal flanges 4 which extend from the tops of the legs of the U-shaped recess forming device. The ends of this recess forming device are provided with wall members 6 to close and isolate the inner portion of this U-shaped member from the remaining portion of the mold cavity, and the flanges 4 have a longitudinal extent which exceeds the extent of the U-shaped recess forming device beyond the walls 6 so that they are placed (flanges 4) between the lower portion 3 and upper portion 7 in the rack.

In operation therefore, the following methods can be employed to produce a plurality of hot dogs in an effortless manner. The mold members 9 are inserted within the tray, a portion of dough is distributed in each of these mold members, the recess forming device 23 is inserted within the mold, the tray assembly is partially cooked, then frozen, and then stored for subsequent use.

Alternatively, the operation can proceed substantially as delineated above but baking is completed so that a cooked hot dog is merely inserted into the recess. In the former case the hot dog is inserted into the partially baked roll, and additional cooking will simultaneously cook both the roll and the hot dog together.

Figure 8:
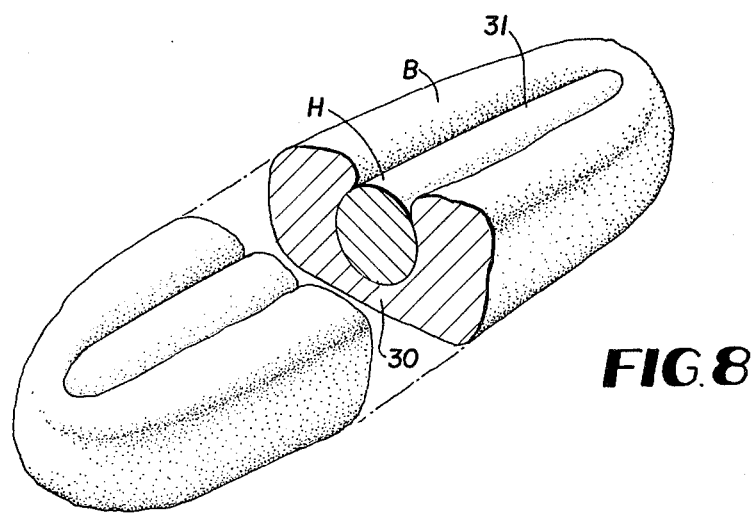
FIG. 8 provides a graphic depiction of the hot dog and roll thus formed according to the present invention.

Having thus described the invention, it will be apparent from FIG. 8 that the article thus formed produces an attractive vehicle for consumming hot dogs and buns in which the hot dog provides an oval ridge on the top face of the bun which serves to provide a nesting area for condiments to be added. In addition, it will be noted that the bottom portion below the hot dog 30 is not hinged in the conventional hot dog manner and therefore it is not as prone to separate as is the case in con- ventional hot dog buns. The oval ridge thus formed by the insertion of the hot dog and the bun along the recess provides an easy method for distributing condiments thereon.

Having thus described the invention it will be apparent that numerous structural modifications are contemplated as being a part of this invention as set forth hereinabove and as defined in the claims.

What is claimed is:

1. A pan assembly for fabricating hot dog buns having a recess to accommodate a complimentally formed hot dog comprising:

a rectangular tray having a flat bottom panel, vertically upstanding walls contiguous therewith extending around said bottom panel, a holding rack having a first pair of opposed parallel edges with a length longer than a one dimension of said bottom panel whereby said first pair of edges extend over two of the upstanding walls of said tray to form two lips for removing said rack from said tray, said rack having a second pair of opposed parallel edges thereby forming a substantially rectangular frame with said first pair of edges, said second pair of edges defined by a lower portion and a longer upper portion parallel thereto and spaced therefrom, p1 plural molds disposed within and constrained by said rack, and recess forming means disposed one within each mold and supported by said rack, whereby when said rack is removed from said tray said recess forming means is carried therewith and said mold is left behind, in which said molds are defined by a generally ovaloid configuration having open top and bottom faces and are provided with plural tab members extending horizontally outwardly from the longitudinal extent of said oval mold at the top face thereof and said tab members abut against said lower portion of said second pair of edges of said rack so as to constrain said mold in said tray.

2. The device of claim 1 in which said recess forming means comprise:

a substantially U-shaped recess portion wherein the top of the U tapers inwardly and continues thereafter to form a two horizontal flanges having a length greater than the U portion, said flanges have a thickness suitable to slide within the space between said second pair of edges upper and lower portions of the rack, and said U-shaped portion has front and rear end walls closing said U-shaped recess while still providing a bun area between said end walls and mold, and the bottom of said recess provides a bun area between said recess and said bottom panel of said tray.

3. The device of claim 2, in which said rack has a vertical wall extending from a terminus of said lower edge portion to the tray bottom panel.

* * * * *